Inventors
HAROLD J. SCHRADER
GILBERT SWIFT
Attorney

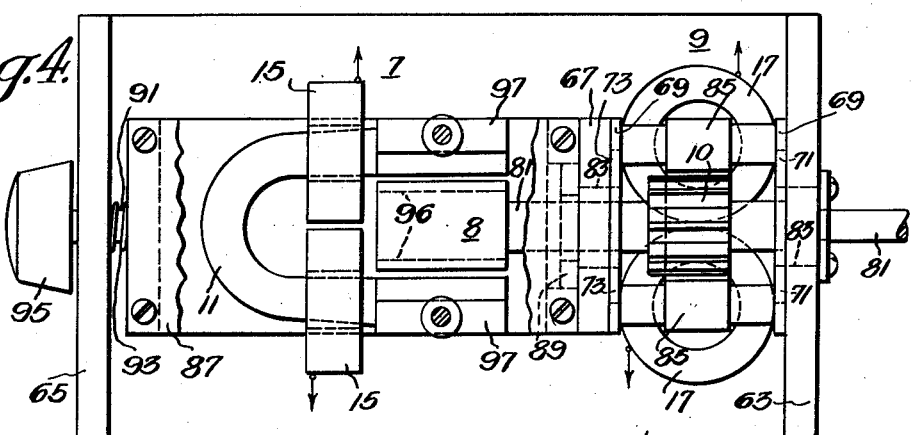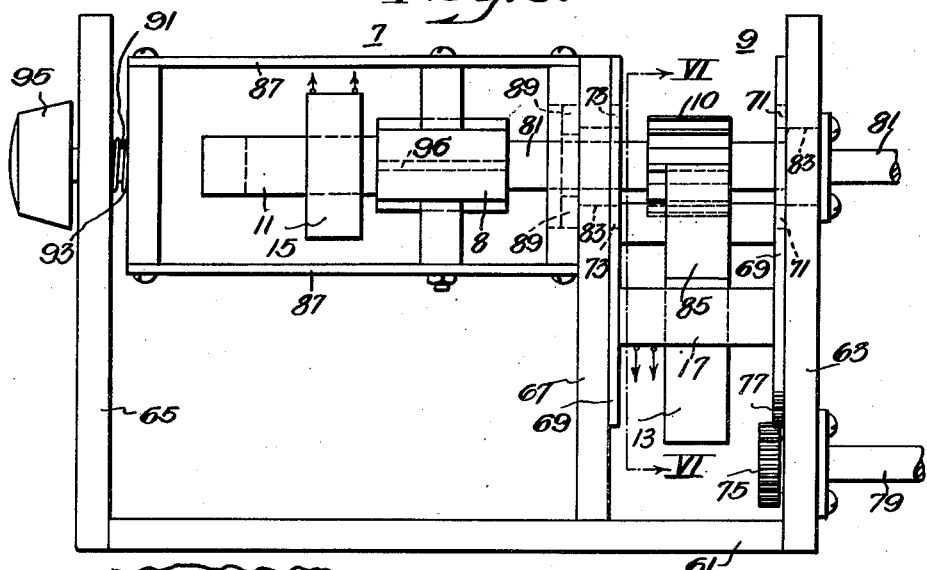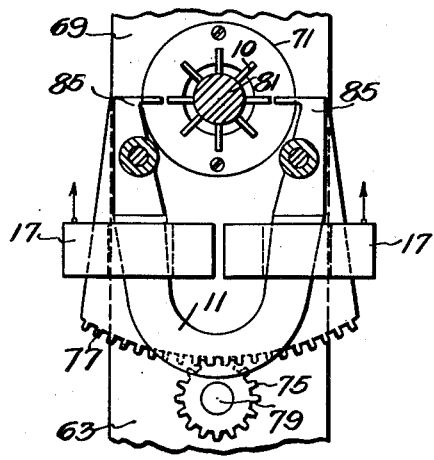

Patented June 1, 1937

2,082,030

UNITED STATES PATENT OFFICE 2,082,030

PHASE INDICATOR

Harold J. Schrader, Haddon Heights, N. J., and Gilbert Swift, Philadelphia, Pa., assignors to Radio Corporation of America, a corporation of Delaware Application May 26, 1936, Serial No. 81,808

5 Claims. (Cl. 73—185)

Our invention relates to phase indicators. More specifically our invention relates to a cathode ray oscillograph which traces the pattern of one variable function and indicates the relative phase of another variable.

We are aware of the use of cathode ray oscillographs for tracing the pressure curve of an internal combustion motor. One embodiment of our invention may be used to synchronize the sweep or timing circuit of a cathode ray oscillograph with the rotation of the drive shaft of an internal combustion motor and to simultaneously impress marks, by means of the cathode ray, to indicate top or bottom, or both top and bottom, dead centers of a piston moving within such motor. In this embodiment of our invention the curve of dynamic pressure within the cylinder may be traced, with indications of the relative piston positions. Thus, broadly speaking, the relative phases of the cylinder pressure and piston position are indicated.

One of the objects of our invention is to synchronize the sweep or timing circuit of a cathode ray oscillograph with a variable function whose variation is to be observed.

Another object is to synchronize the timing circuit of an oscillograph and include marks from which the relative phase of two varying functions may be determined.

A still further object is to trace the curve of dynamic pressure within the cylinder of an internal combustion motor, synchronizing the curve with the piston movement, and indicating top and bottom dead centers of the piston movement.

Figure 1:
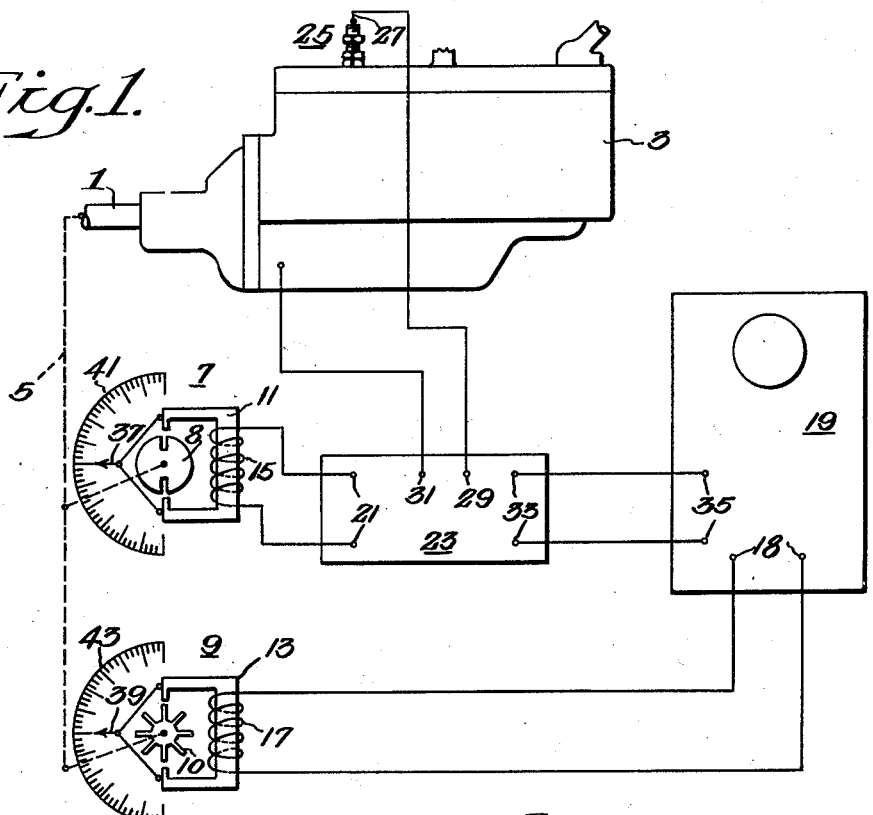
Figure 2:
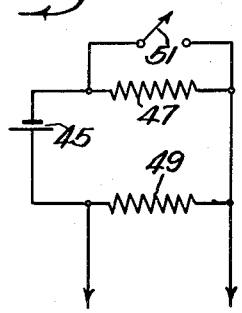
Figure 3:
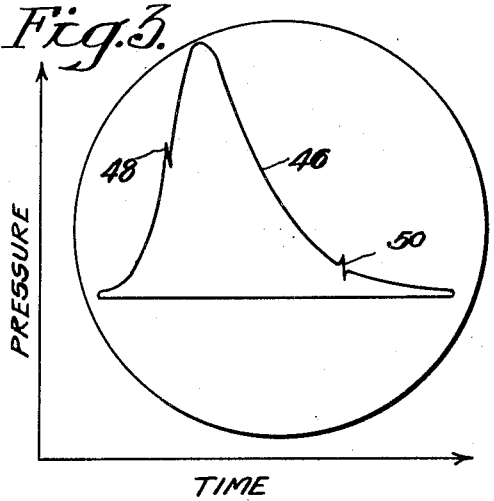

Our invention may be best understood by referring to the accompanying drawings in which Figure 1 is a schematic illustration of one application of our invention, Fig. 2 is a circuit diagram of a modification of one of the elements of Fig. 1, Fig. 3 illustrates a cathode ray curve showing pressure within the cylinder of an internal combustion motor and includes marks indicating top and bottom dead centers of the piston movement, Fig. 4 is a plan view of the synchronizing and marking generators shown schematically in Fig. 1, Fig. 5 is a side elevation of the generators shown in Fig. 4, and Fig. 6 is a sectional elevation of the generators taken along VI—VI of Fig. 5.

Referring to Fig. 1, the drive shaft 1 of an internal combustion motor 3 is connected by suitable couplings 5 to the rotors 8, 10 of a pair of alternators 7, 9. The output currents of the alternators preferably have sharply peaked wave forms. The fields for the alternators are permanent magnets 11, 13 on which are mounted pickup coils 15, 17. One of the pickup coils 17 is connected to the synchronizing terminals 18 of a cathode ray oscillograph 19. The oscillograph, per se, is not our invention and since the oscillograph is commercially available, type RCA TMV 122, a detailed description may be omitted from the present application.

The other pickup coil 15 is connected to appropriate input terminals 21 of the amplifier 23. A suitable piezo electro-element 25, or the like, is inserted within one of the cylinders of the motor 3. A terminal 27 of the piezo electric element is connected to one of the input terminals 29 of the amplifier 23. The other input terminal 31 is connected to the motor 3 which is used as a common connection to the piezo electric element. The output terminals 33 of the amplifier 23 are connected to the vertical deflecting terminals 35 of the oscillograph 19.

The field magnets 11 and 13 are preferably mounted so that they may be rotated to adjust the relative phases of the generated currents with respect to the drive shaft 1 and with respect to the cathode ray sweep or timing circuit. The field magnets 11 and 13 may be equipped with pointers 37, 39 and appropriate scales 41, 43. The armatures 8 and 10 by virtue of the coupling 5 are rotated with the motor shaft 1 and remain in fixed position with respect to the shaft. The coupling 5 is preferably adjusted so that the slots in the armature 8, when aligned with the poles of field 11, correspond with top and bottom dead centers of the piston within the cylinder under observation. The armature or field may be adjusted to indicate other piston positions.

The theory of operation is as follows: Assuming the motor 3 is operating in normal manner as an internal combustion engine, variable pressures will be generated within the cylinder under observation. These variable pressures act on the piezo electric element 25 and create voltages which are substantially directly proportional to the pressure. These voltages are impressed on the input to the amplifier 23. The amplified voltages are impressed on the vertical deflecting terminals 35 of the oscillograph 19; thus the cathode ray is vertically deflected.

The operation of the motor 3 causes the armature 10 of generator 9 to rotate in step with the motor. Currents created by this generator 9 are in synchronism with the motor 3 and are used to establish corresponding synchronized timing impulses which cause horizontal deflections of the cathode ray. It will be observed that the armature 10 has eight poles. Our invention is not limited to any precise number of poles. In fact the timing or sweep circuit of the oscillograph may be synchronized by a multiple or submultiple of the impulses created by the generator 9. By suitably rotating the field 13 the position of the curve traced by the cathode ray may be adjusted with respect to the center of the horizontal deflection.

A pair of impulses, corresponding to top and bottom dead centers of the piston movement, are generated by the slots in the armature 8. These impulses are amplified. The amplified impulses are impressed on the vertical deflecting terminals 35. The curve 46 traced by the cathode ray is illustrated in Fig. 3. The marking impulses corresponding to top and bottom dead centers are respectively indicated by reference numerals 48, and 50. The sharp impulses are particularly desirable to clearly and sharply mark the piston positions. The alternating wave form, extending the marks 48, 50 above and below the curve 46, add utility to the indication when the mark is on a nearly vertical portion of the curve, as shown at 48. A single unilateral impulse would be less discernible.

Instead of employing the marking alternator 7, a make and break mechanism may be used. A suitable circuit is indicated in Fig. 2. A battery 45 is discharged through a pair of resistors 47, 49. A make and break contact or switch 51 is connected across one of the resistors 47. The switch is operated by a cam connected to the motor shaft 1. The output impulses are dependent on the variation of current in the resistor 49 caused by the opening and closing of switch 51. In some instances the ignition impulses of the motor may be used but we prefer the independent impulse generator.

By way of illustration a suitable arrangement of synchronizing and marking alternators is shown in Figs. 4, 5 and 6. Throughout these and the preceding figures similar reference numerals will be used to indicate similar parts. On a base 61 are mounted end 63, 65 and center 67 supports. The field magnet 13 of the synchronizing alternator 9 is mounted in a cradle 69. The cradle is rotatably supported by circular shoulders 71, 73 which project from the end 63 and center 67 supports. A pinion gear 75, engaging a gear segment 77, is rotated by shaft 79 to rotate the field 13 with respect to its armature 10.

The armature 10 is secured to a shaft 81 which is suitably mounted in ball bearings 83 or the like. The bearings 83—83 are mounted in the end 63 and center 67 supports. The armature rotates within the pole pieces 85—85 which are preferably of the width of the armature teeth. The narrow shape of the pole piece and armature teeth give the desired sharply defined impulses which are created in the pickup coils 17. One or more pickup coils may be used.

The field magnet 11 of marking impulse alternator 7 is mounted in a cradle 87. One end of the cradle 87 is rotatably supported by a circular shoulder 89 which projects from the center support 67. The other end of the cradle 87 is secured to a shaft 91. The shaft is rotatably supported in the end member 65. A thrust spring 93 prevents the cradle from rotating too freely. A knob 95 attached to the shaft 91 may include an indicating scale. The knob is used to rotate the cradle, and field 11 mounted therein, with respect to the armature 8.

The armature 8 is secured to an extension of shaft 81 which has previously been described. The armature 8 includes a pair of slots 96. The pole pieces 97—97 of the field magnet 11 are narrowly shaped so that their faces opposing the slots are of substantially the same area as the slots 96. The narrow form of the slots and pole pieces generate sharply defined impulses whose wave forms are indicated by the marking impulses 48—50. The generated currents are picked up in the coils 15—15.

While our invention is illustrated in its application to the measurement of pressure curves in an internal combustion motor, its use is not limited thereto. By way of example, the invention may be applied to the measurement of pressures in a pump, compressor, or in fact a variety of motions or effects where it is desirable to indicate the relative phase of two or more variable functions. Likewise, while a piezo electric element has been chosen by way of illustration, any element which will convert pressure to electrical potentials may be used. It is probably obvious that one, two, or several marking impulses may be used to indicate various predetermined elements of a variable function.

We claim as our invention:

1. A phase indicating system comprising an oscillograph including vertical and horizontal deflecting means, means deriving an electrical impulse substantially proportional to a function whose variation is to be observed, means for synchronizing one of said deflecting means with said variation, means for impressing said derived impulse on the other of said deflecting electrodes, and means including an alternator whose output currents have a sharply defined wave form for impressing a marking impulse derived from another variable function so that the relative phases of said variable functions may be observed.

2. An indicator of pressures within a cylinder of an internal combustion engine, said cylinder including a reciprocating piston; comprising a cathode ray oscillograph having horizontal and vertical deflecting electrodes; means for impressing variable voltages on said horizontal electrodes, said variable voltages being synchronized with said engine movements; means for deriving electrical variations corresponding to the variations of pressure in said cylinder; means for impressing the last mentioned electrical variations on said vertical deflecting electrodes; means including an alternator having output currents of sharply defined wave form for deriving electrical impulses corresponding to predetermined positions of said piston; and means for impressing the last mentioned impulses on said vertical deflecting electrodes so that said piston positions may be marked by deflections of said cathode ray.

3. An indicator of pressures within an internal combustion engine, said engine including a cylinder, reciprocating piston, and drive shaft, comprising a cathode ray oscillograph having a vertical deflecting axis and a timing axis, a pair of alternators whose armatures are coupled to said drive shaft, one of said alternators generating impulses which synchronize said timing axis, the other of said alternators generating impulses which indicate positions of said piston on said vertical deflecting axis, and means for indicating the variation of pressure within said cylinder on said vertical axis.

4. In a device of the character of claim 3, means for adjusting the relative phases of currents generated by said alternators.

5. A phase indicating system comprising an oscillograph including a pair of deflecting means disposed in 90° relationship, means for synchronizing one of said deflecting means with a variable function whose characteristics are to be indicated, means for impressing electrical impulses substantially proportional to the variation of said function on the other of said deflecting means, means for impressing a marking impulse on the last mentioned deflecting means for indicating fixed points in a second variable function whose phases are to be compared with said first mentioned variable function, and further characterized in that said means for impressing a marking impulse includes an alternator whose output currents have a sharply defined wave form.

HAROLD J. SCHRADER.
GILBERT SWIFT.